US00RE46857E

(19) United States
(12) Reissued Patent
Matsugata

(10) Patent Number: US RE46,857 E
(45) Date of Reissued Patent: May 22, 2018

(54) ELECTRIC BLIND RIVET SETTING DEVICE

(71) Applicant: NEWFREY LLC, Newark, DE (US)

(72) Inventor: Hiroyuki Matsugata, Toyohashi (JP)

(73) Assignee: NEWFREY LLC, New Britain, CT (US)

(21) Appl. No.: 14/709,809

(22) Filed: May 12, 2015

Related U.S. Patent Documents

Reissue of:
(64) Patent No.: 8,443,512
Issued: May 21, 2013
Appl. No.: 13/079,246
Filed: Apr. 4, 2011

(30) Foreign Application Priority Data

Apr. 6, 2010 (JP) ..... 2010-87788

(51) Int. Cl.
*B21J 15/10* (2006.01)
*B21J 15/04* (2006.01)
*B21J 15/26* (2006.01)
*B21J 15/32* (2006.01)

(52) U.S. Cl.
CPC ..... *B21J 15/043* (2013.01); *B21J 15/105* (2013.01); *B21J 15/26* (2013.01); *B21J 15/326* (2013.01); *Y10T 29/49771* (2015.01); *Y10T 29/49943* (2015.01); *Y10T 29/49956* (2015.01); *Y10T 29/53065* (2015.01); *Y10T 29/5373* (2015.01)

(58) Field of Classification Search
CPC ..... Y10T 29/5373; Y10T 29/53752
USPC ..... 29/243.521, 243.526
See application file for complete search history.

(56) References Cited

U.S. PATENT DOCUMENTS

| | | | | |
|---|---|---|---|---|
| 3,033,410 | A * | 5/1962 | Hanneman | 29/243.526 |
| 3,095,106 | A * | 6/1963 | Morrison | 29/243.526 |
| 4,137,747 | A * | 2/1979 | Clarke et al. | 29/243.521 |
| 4,178,869 | A * | 12/1979 | Turrentine | 114/172 |
| 4,541,266 | A | 9/1985 | Totsu | |
| 4,648,258 | A * | 3/1987 | Frearson | 29/243.525 |
| 4,770,023 | A * | 9/1988 | Schwab | 29/243.523 |
| 5,473,805 | A | 12/1995 | Wille | 29/243.526 |
| 5,605,070 | A | 2/1997 | Wille | |
| 6,704,986 | B1 * | 3/2004 | Liu | 29/243.525 |
| 7,290,317 | B2 * | 11/2007 | Kato et al. | 29/243.521 |
| 8,061,574 | B2 * | 11/2011 | Lesser et al. | 227/131 |

(Continued)

FOREIGN PATENT DOCUMENTS

| | | |
|---|---|---|
| JP | 2003-266143 A | 9/2003 |
| JP | 2008-168324 A | 7/2008 |

*Primary Examiner* — Robert M Fetsuga
(74) *Attorney, Agent, or Firm* — Kofi A. Schulterbrandt; Michael P. Leary

(57) ABSTRACT

The present invention provides a small electric blind rivet setting device that is capable of being driven by a battery and that does not require a pathway for recovering the broken mandrels to be provided in the motor shaft. A recovery container 10 is provided in a tool housing 27 forward of an electric motor 13 in the axial direction, and a spindle 14, which rotates because of the rotation of a drive shaft 18 connected to the electric motor circumventing the recovery container, is connected so as to move a pulling head (30) in the axial direction. The positive rotation, stopping of rotation and reverse rotation of the electric motor are controlled by a pulling operation on a trigger and detecting the position of the pulling head in the axial direction.

5 Claims, 10 Drawing Sheets

(56) References Cited

U.S. PATENT DOCUMENTS

| | | | | |
|---|---|---|---|---|
| 2001/0020322 | A1* | 9/2001 | Wille | 29/243.521 |
| 2004/0165945 | A1* | 8/2004 | Shibata | 403/282 |

* cited by examiner

ELECTRIC BLIND RIVET SETTING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: This is a reissue application of U.S. Pat. No. 8,443,512.*

CROSS-REFERENCE TO RELATED APPLICATIONS

This application claims priority from Japanese Patent Application No. 2010-87788, filed on Apr. 6, 2010, the disclosure of which is incorporated herein by reference.

BACKGROUND OF THE INVENTION

The present invention relates to an electric blind rivet setting device that uses an electric motor and more specifically to an electric blind rivet setting device that does not require a passage for recovering the broken mandrel after the setting of a blind rivet to be provided in the center of the electric motor shaft.

A blind rivet comprises a mandrel and a rivet body, and the rivet body comprises a hollow cylindrical sleeve and a large diameter flange formed on one end of the cylindrical sleeve. The mandrel comprises a shaft part that passes through the rivet body and extends lengthwise from the flange to be gripped by a blind rivet setting device and a mandrel head with a diameter larger than the inside diameter of the cylindrical sleeve disposed so as to abut the side on the opposite end of the cylindrical sleeve and protrude. The grippable part of the mandrel shaft part of the blind rivet is inserted into the nose of the blind rivet setting device and held in the blind rivet setting device in a state such that the rivet body and mandrel head extend from the nose. The sleeve of the rivet body of the blind rivet held by the blind rivet setting device is inserted into an attachment hole in members being riveted, and the flange is brought into contact with the surface of the members being riveted. Next, the mandrel shaft part is pulled by the operation of a pulling head of the blind rivet setting device strongly enough to break a breakable part with a small diameter formed in the shaft part of the mandrel. The mandrel head causes part of the sleeve to expand and deform, and the rivet body is set in the members being riveted by the members being riveted being strongly sandwiched between that expanded and deformed sleeve part and the flange. When the members being riveted are an automotive body panel and a component being attached to that automotive body panel, the component is secured to the automotive body panel by setting a blind rivet into both members in a state such that the attachment part of the component is mounted on the automotive body panel. Blind rivets have the advantage of setting operations being possible from one side even with panels having a large surface area such as automotive body panels as the members being riveted. In general, blind rivets are made of metal materials such as steel and aluminum. After setting the rivet, the shaft part of the blind rivet mandrel that has been broken must be separated and recovered by the blind rivet setting device.

PRIOR ART DOCUMENTS

Patent Reference 1: Published Unexamined Japanese Patent Application No. H05-200476

Patent Reference 2: Published Unexamined Japanese Patent Application No. 2003-266143

Patent Reference 3: Published Unexamined Japanese Patent Application No. 2008-168324

Patent Reference 1 describes an electric blind rivet setting device that uses an electric motor driven by a battery for a blind rivet setting device. An electric motor held in a handle drives a blind rivet setting mechanism. The mandrel head of the blind rivet gripped in the nose is pulled with enough strength to break the mandrel shaft part at the small diameter breakable part while expanding and deforming part of the sleeve, and the blind rivet is set in the members being riveted. Unlike pneumatically driven blind rivet setting devices and hydraulic driven blind rivet setting devices, electric blind rivet setting devices driven by batteries do not require a pressurized fluid supply tube connected between a supply source for a pressurized fluid such as compressed air or hydraulic pressure and the handle. The burden on the worker holding the handle is reduced, and the riveting work becomes easy. A recovery container that collects the parts of the mandrel shaft parts that are broken off is disposed to the rear of the blind rivet setting mechanism in the electric blind rivet setting device described in Patent Reference 1. An electric motor of a size that substantially balances the setting mechanism and the handle is disposed between the blind rivet setting mechanism accommodated in a cylindrical housing and the handle extending substantially perpendicular to this setting mechanism and is surrounded by that housing in this electric blind rivet setting device. The dimensions of the device as a whole are increased in the part adjacent to the handle, and the weight of the handle increases. Therefore, the electric motor part adds weight for the worker holding the handle, and the weight the worker holds is increased. There is margin for improvement for allowing workers to perform nimble operations.

Patent Reference 2 describes an electric blind rivet setting device that uses an electric motor. In this device, the blind rivet setting mechanism, collection container for the broken mandrel shaft parts and electric motor are disposed in a coaxial alignment between the setting mechanism and collection container in a substantially cylindrical housing. In this electric blind rivet setting device, the electric motor is disposed between the blind rivet setting mechanism and the handle; therefore, the size of the device as a whole is smaller than that of the setting device described in Patent Reference 1. The weight for the worker holding the handle is lighter, and the blind rivet setting operation may be carried out nimbly. In such publicly known electric blind rivet setting devices, the motor is provided between the blind rivet setting mechanism and the collection container for the broken mandrel shaft parts. Therefore, a passage for recovering the broken mandrel shaft parts must be formed in the center of the motor shaft, the center of the motor shaft formed hollow and the electric motor used formed with a special structure.

It is preferable to be able to use a general-purpose electric motor that is not required to have a recovery passage for the broken mandrel shaft parts in the center of the shaft in a electric blind rivet setting device.

Patent Reference 3 describes a hydraulic drive blind rivet setting device controlled by a pneumatic control mechanism.

This blind rivet setting device comprises a blind rivet setting mechanism accommodated in a cylindrically shaped housing and a handle extending substantially perpendicular to this cylindrically shaped setting mechanism housing. A recovery container for broken mandrel shaft parts is provided at the back end of the housing. When the trigger lever provided in the handle is operated, the pneumatic control mechanism provided inside the handle operates, and the hydraulic control mechanism for the blind rivet setting mechanism operates. A strong pulling force acts on the mandrel shaft part of the blind rivet gripped in the nose, and the mandrel shaft part is broken at the small diameter breakable part while the mandrel head expands and deforms part of the sleeve. The blind rivet is set in the members being riveted, and the broken mandrel shaft part is collected in the recovery container. The blind rivet setting device of Patent Reference 3 must have a supply tube for compressed air extending from a compressed air source connected to the handle, and that supply tube places a burden on the operations of workers. The convenient operation of the battery driven electric blind rivet setting devices of Patent Reference 1 and Patent Reference 2, which do not require fluid supply tubes, cannot be expected. In addition, release from the troublesome work that goes with pulling around the supply tube cannot be expected.

An object of the present invention is to provide a small electric blind rivet setting device that is capable of being driven by a battery and does not require a pathway for recovering the broken mandrels to be provided in the motor shaft.

SUMMARY OF THE INVENTION

To achieve this object, according to the present invention, there is provided an electric blind rivet setting device comprising a hollow nose that accepts a mandrel of a blind rivet comprising a mandrel and rivet body, a tool housing disposed in the axial direction behind that nose, jaws that are disposed inside the nose and grip the mandrel accepted inside the nose, a pulling head that is inside the nose, pulls the jaws backwards in the axial direction from a home position when pulled backwards in the axial direction from the home position at the front end in the axial direction and returns the jaw to the home position at the front end in the axial direction when returned to the home position from the back position in the axial direction, an electric motor that forms a drive power source moving the pulling head in the axial direction and a drive force transfer means to pull the pulling head from the home position backward in the axial direction and return it forward in the axial direction to the home position from the back position in the axial direction by the rotation of the electric motor. The electric motor is operated by operating a trigger provided in a handle connected in an integrated manner to the tool housing and extending downward from the tool housing. The electric blind rivet setting device is such that the sleeve of a rivet body is deformed such that it expands by the mandrel of a blind rivet gripped in the jaws being pulled backward in the axial direction from the home position for the pulling head, and the rivet body is set in members being riveted by the expanded and deformed sleeve part and flange of the rivet body. A recovery container that receives the part of the broken mandrel shaft part from the pulling head when the rivet body is set in the members being riveted is provided in a part on the front side of the electric motor in the axial direction that is an upper part of a part connected to the handle on the tool housing. The electric motor is at the back end of the tool housing and is disposed on the rear side in the axial direction of the recovery container. The drive force transfer means is provided in a part of the tool housing below the recovery container, circumventing the recovery container. The drive force transfer means is connected to the electric motor on the rear side of the recovery container such that it rotates by the rotation of the electric motor and is provided with a drive shaft that extends forward in the axial direction from the back end and is capable of rotating around the axis and a spindle that is connected to the end part of the drive shaft at the front side of the recovery container such that it rotates by the rotation of the drive shaft. The spindle is connected to the pulling head such that the pulling head is moved backward in the axial direction or forward in the axial direction by the rotation of the spindle. There is provided a control means that controls the electric motor positive rotation, stopping of rotation and reverse rotation by detecting pulling operations of the trigger and the position of the pulling head in the axial direction due to the rotation of the drive shaft.

As described above, the recovery container is provided in a position forward of the electric motor in the tool housing; therefore, the electric blind rivet setting device that may be driven by a battery according to the present invention no longer requires that a passage for recovering the broken mandrels be provided in the center of the motor shaft. Furthermore, even if the recovery container for the broken mandrels is provided between the electric motor and the pulling head, the control means may carry out the operation of pulling the pulling head from the home position and returning it to the home position by the electric motor without any inconvenience.

In the setting device described above, the drive shaft is disposed so as to be able to rotate in the space below the recovery container around the axis by a rear gear mated to a motor gear connected to the electric motor and a front gear mated to a spindle gear connected to the spindle. External threads are formed in the outer circumferential surface of the drive shaft between the rear gear and front gear. The control means performs control such that a space is opened in the axial direction and the drive shaft is screwed with no rotation around the axis of the drive shaft and comprises a first collar and a second collar that move in the axial direction on the drive shaft because of the rotation of the drive shaft, a first sensor positioned in the tool housing adjacent to the first collar and a second sensor positioned in the tool housing adjacent to the second collar and a control circuit that receives a signal from the first sensor, a signal from the second sensor and a signal from the pulling operation of the trigger. There is a control circuit that operates such that, when the pulling head is in the state of being in the home position, the electric motor is rotated positively such that the pulling head is brought back in the axial direction when the operation of pulling the trigger is carried out; when the pulling head has been pulled back to the back position in the axial direction, the rotation of the electric motor is stopped and with the release of the trigger pulling operation, the electric motor reverses rotation, and the pulling head is returned to the home position.

In addition, in the setting device described above, the first sensor is a first microswitch that is turned on and off by the movement of the first collar on the drive shaft in the axial direction, and the second sensor is a second microswitch that is turned on and off by the movement of the second collar on the drive shaft in the axial direction.

When the pulling head in the setting device described above is in the state of being in the home position, an off signal is output from the trigger switch of the trigger that is not pulled. The first collar energizes the first microswitch and an on signal is output by the first microswitch. An off signal is output by the second microswitch without the second microswitch being energized by the second collar, and the control circuit is in the home position state.

The control circuit rotates the electric motor positively when the trigger is operated by pulling, and an on signal is output by the trigger switch in the home position state. The drive shaft is rotated, and the spindle is rotated. The pulling head is pulled in the axial direction, and the blind rivet mandrel gripped by the jaws is pulled axially a prescribed length backward in the axial direction. The blind rivet is set in the members being riveted, and the mandrel shaft part gripped in the jaws is broken. Furthermore, the positive rotation of the electric motor is stopped by an off signal output by the first microswitch because the first collar is moved a prescribed length in a first direction by the rotation of the drive shaft and is at a distance from the position where the first microswitch is energized, an on signal output by the second microswitch because the second collar is moved a prescribed length in the first direction and an on signal from the trigger switch. If the pulling operation of the trigger is released after the positive rotation of the electric motor is stopped, an off signal is received from the trigger switch, an off signal from the first microswitch and an on signal from the second microswitch. The drive motor is rotated in reverse, the drive shaft rotated and the spindle rotated in reverse. The pulling head returns forward in the axial direction and, along with the jaw, returns to the home position. Furthermore, the first collar moves a prescribed length in a second direction opposite to the first direction by the rotation of the drive shaft and returns to the position that activates the first microswitch. An on signal is output by the first microswitch. The second collar moves a prescribed length in the second direction, and the second microswitch is separated from the position that energizes it. An off signal is output by the second microswitch. The home position state is assumed because of the off signal from the trigger switch, the on signal from the first microswitch and the off signal from the second microswitch.

If, in the setting device described above, the trigger pulling operation is released before the positive rotation of the electric motor is stopped during the positive rotation of the electric motor, an off signal is received from the trigger switch, an off signal from the first microswitch and an off signal from the second microswitch, and the control circuit rotates the electric motor in reverse.

MODE FOR CARRYING OUT THE INVENTION

Figure 1:
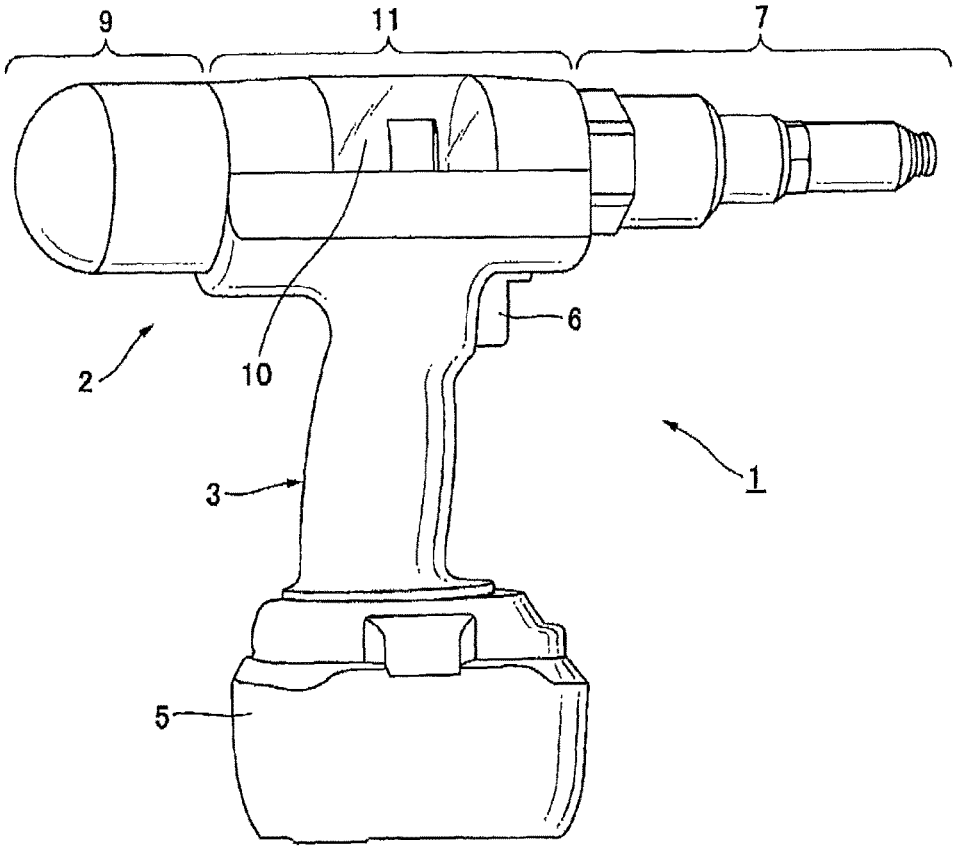
FIG. 1 is a front view of the appearance of an electric blind rivet setting device according to a first embodiment of the present invention.

In the following, an embodiment of the electric blind rivet setting device according to the present invention will be described with reference to the drawings. In FIG. 1, an electric blind rivet setting device 1 has a mechanism for setting blind rivets and comprises a blind rivet setting mechanism 2 accommodated in a substantially cylindrically shaped housing and a handle 3 extending so as to be hanging substantially perpendicular from a middle position of this setting mechanism 2. A battery is attached so as to be attachable and detachable to a battery holding section 5 at the bottom end of the handle 3. A trigger 6 is provided in a position adjacent to the setting mechanism 2 in the handle 3. A worker operates the setting mechanism 2 by pulling the trigger 6, and the blind rivet setting operation is carried out. The setting mechanism 2 is returned to the home position by releasing the pulling operation of the trigger 6, and the setting operation is released (or stopped). The blind rivet setting mechanism 2 comprises a nose *or nose piece* 7 on the end of the front side (end of right side in FIG. 1) and a motor section 9 at the end of the rear side (end of left side in FIG. 1). A pulling head 30 (FIG. 3 and the like) that pulls the mandrel shaft part of the blind rivet toward the back (leftward in FIG. 1) is provided in the nose 7, and an electric motor is accommodated in the motor section 9. A recovery container 10 for broken mandrel shaft parts is formed between the nose 7 and motor section 9 in a position close to the handle 3 on the upper part of the side opposite the handle 3. The recovery container 10 is formed in a semi-circular cylindrical shape and is surrounded by a transparent or semi-transparent cover. The cover allows the mandrel shaft parts that are held to be seen from the outside and is formed so as to be openable and closable such that they may be disposed of.

A drive force transfer and control section 11 is provided in a part other than the recovery container 10 between the motor section 9 and the nose 7. A *drive force transfer gear train otherwise known as a* mechanism for transferring the rotational force (torque) of an electric motor 13 in the motor section 9 to a spindle 14, which is a rotating shaft inside the nose 7, and a control mechanism that controls the pulling operation of the trigger and the rotation of the electric motor 13 by the release operation thereof and controls the forward movement and backward movement of the pulling head in the nose 7 through the rotation of the spindle 14 are provided. The electric blind rivet setting device 1 sets blind rivets with an electric motor that has a battery as the power source. Therefore, operation does not require a fluid supply tube for compressed air or the like and is released from the troublesome operations accompanying pulling around a fluid supply tube.

Figure 3:
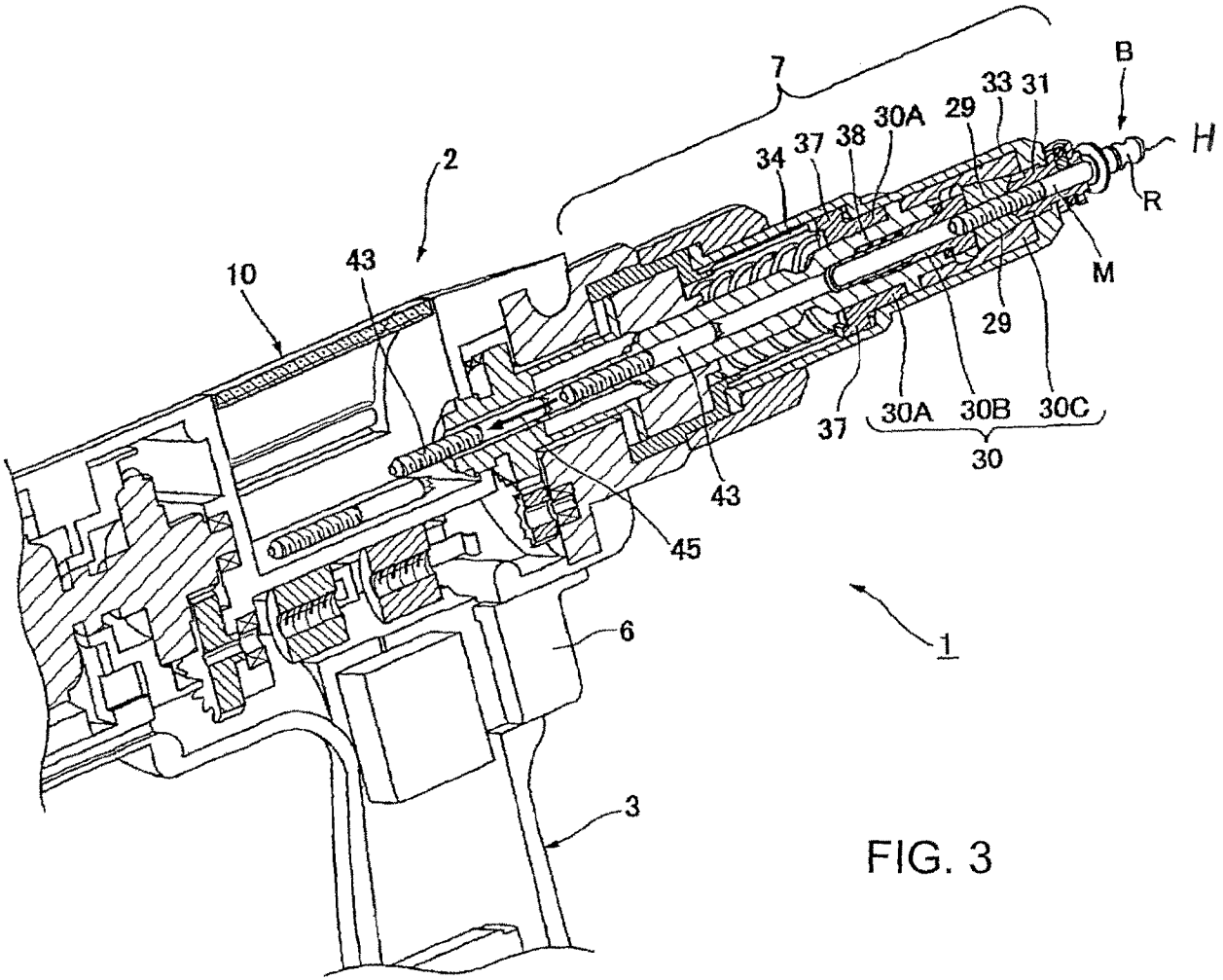
FIG. 3 is a partial perspective showing a vertical cross-section of the front part of the setting mechanism and part of the handle of the blind rivet setting device in FIG. 1 and is a drawing showing the state in which a blind rivet is loaded in the nose.

A blind rivet B to be set in members to be riveted such as automotive body panels, attached components and the like by the electric blind rivet setting device 1 is held in the nose 7 in FIG. 3. The blind rivet B comprises a rod shaped mandrel M and a hollow cylindrically shaped rivet body R. The rivet body R comprises a cylindrical sleeve and a flange with a diameter larger than the cylindrical sleeve formed at one end of the cylindrical sleeve. The mandrel M is formed from a rod shaped body that passes through the rivet body and extends lengthwise from the flange and comprises a shaft part that passes through the flange of the rivet body R and has a part gripped in the nose 7 and a mandrel head H formed with a diameter larger than the inside diameter of the cylindrical sleeve and disposed so as to extend from the other end of the cylindrical sleeve. The grippable part of the mandrel shaft part of the blind rivet B is inserted into the nose 7 of the blind rivet setting device 1 and held in the blind rivet setting device in a state such that the rivet body R and mandrel head H extend from the nose. The sleeve of the rivet body R of the blind rivet B held in the blind rivet setting device 1 is inserted into an attachment hole in the members being riveted until it contacts the surface of a member being riveted, such as an automotive body panel or attached component. Next, the mandrel shaft part is pulled by the blind rivet setting device 1, and the mandrel head H expands and deforms part of the rivet body R sleeve. The members being riveted are strongly sandwiched between this expanded and deformed sleeve part and the flange. The rivet body is set in the members being riveted and the automotive body panel, component and the like are secured by the plurality of members being riveted, such as an automotive body panel, a component or the like, being strongly sandwiched to each other between the sleeve part that has been expanded and deformed and the flange part. Typically, the blind rivet B is formed from a metal material such as steel, aluminum or the like. After the blind rivet has been set, the broken mandrel shaft part must be separated and recovered.

Figure 2:
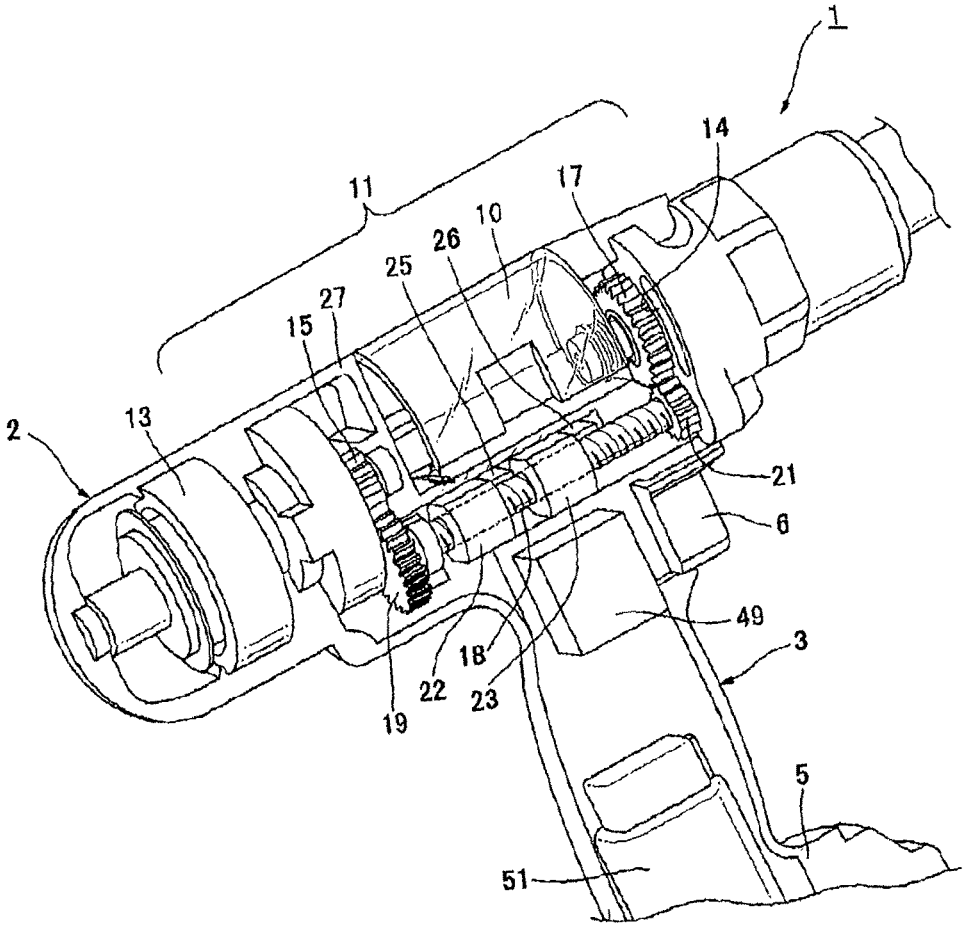
FIG. 2 is a partial perspective view showing the back half part of the setting mechanism and the main parts of the handle of the electric blind rivet setting device in FIG. 1 in a cutaway.

FIG. 2 shows the structure of the drive force transfer and control section 11, which is an important part of the electric blind rivet setting device 1 according to the present invention. The drive force transfer and control section 11 has a mechanism for transferring the rotational force from the electric motor 13 in the motor section 9 to the spindle 14 in the nose 7, circumventing the space occupied (blind rivet setting mechanism 2) by the recovery container 10. A motor gear 15 connected to the motor shaft for the electric motor 13 is disposed at the rear side of the recovery container 10, and a spindle gear 17 connected to the spindle 14 having a shaft center co-axial with the shaft center of the motor shaft is disposed at the front side of the recovery container 10. A drive shaft 18 is provided in the space beneath the recovery container 10 between the motor gear 15 and the spindle gear 17. The drive shaft 18 is mounted parallel to the axial direction of the blind rivet setting mechanism 2, and is supported in the direction parallel to the axial line of the motor shaft of the electric motor 13 and the spindle 14 and supported so as to be rotatable around the axis. A rear gear 19 that is mated to the motor gear 15 is attached at the back end of the drive shaft 18, and a front gear 21 that is mated to the spindle gear 17 is attached at the front end of the drive shaft 18. Because the rear gear 19 is mated to the motor gear 15, the drive shaft 18 is rotated in reverse when there is positive rotation of the electric motor 13, and because the front gear 21 is mated to the spindle gear 17, the reverse rotated drive shaft 18 gives the spindle 14 a positive rotation. Therefore, the spindle 14 rotates in the same direction as the electric motor 13. Moreover, the gear ratios for the motor gear 15 and rear gear 19 and for the front gear 21 and spindle gear 17 may be set freely according to a balance of the electric motor 13 output and blind rivet setting force.

The drive force transfer and control section 11 also has a control mechanism that controls the positive rotation, stopping and reverse rotation of the electric motor 13 according to the pulling operation of the trigger 6 and the release operation thereof. As described above, the rotation of the electric motor 13 is transferred to the spindle 14 through the drive shaft 18. The control mechanism responds to a pulling operation of the trigger 6 and a release operation thereof, and by controlling the electric motor 13, the pulling head 30 in the nose 7 is moved backward from the home position (front end position) to a back end position that breaks the mandrel shaft part of the blind rivet. It is stopped at that back end position, and by releasing the pulling operation on the trigger 6, it moves forward from the back end position returning to the home position at the front end position. As is shown in FIG. 2 and FIG. 6 through FIG. 9, the drive shaft 18 *extends along mandrel container 10 and* is formed with external threads on the circumferential surface, and two collars, a first collar 22 and a second collar 23, each formed with internal threads are screwed onto the drive shaft 18 with a space between them on the drive shaft 18. The first collar 22 and the second collar 23 are slidable in the axial direction of the drive shaft 18 with respect to the bottom wall of the recovery container 10, but are restricted such that they do not rotate with the rotation of the drive shaft 18. The two collars 22, 23 move forward together following the peaks of the threads on the drive shaft 18 because of this restriction when the drive shaft 18 is rotated in reverse by the positive rotation of the electric motor 13 (through the motor gear 15 and the rear gear 19). When the electric motor 13 is rotated in reverse, they move together backwards following the peaks of the threads on the drive shaft 18, which is rotating positively. A first microswitch 25 is affixed to a tool housing 27 (or a member affixed to the tool housing 27) as a first sensor *or first position sensor* adjacent to the first collar 22, and a second microswitch 26 is affixed to the tool housing 27 (or a member affixed to the tool housing 27) as a second sensor *or second position sensor* adjacent to the second collar 23. When the first collar 22 moves forward from the back end position of the drive shaft 18 along the drive shaft 18, the first microswitch 25 is turned from on to off, and when the second collar 23 moves forward from the back end position of the drive shaft 18 along the drive shaft 18 the second microswitch 26 is turned from off to on. *There is therefore provided a control means that controls the electric motor positive rotation, stopping of rotation and reverse rotation by detecting pulling operations of the trigger and the position of the pulling head in the axial direction due to the rotation of the drive shaft.* The details of these control mechanisms and control circuit will be described in the following with reference to FIG. 6 through FIG. 10.

Before describing the drive force transfer and control section 11, the structure and operation of the blind rivet setting mechanism 2 that sets the blind rivets will be described with reference to FIG. 3 through FIG. 5. The nose 7 occupies the front half of the blind rivet setting mechanism 2 in front of the recovery container 10. As is shown in FIG.

3, the shaft center of the nose 7 is formed hollow and receives and holds the mandrel M of the blind rivet B. Furthermore, the broken mandrel shaft parts are sent to the recovery container 10. On the front end side of the blind rivet setting mechanism 2 the nose 7 is provided with jaws 29 as the means for gripping the mandrel M and with the pulling head 30 that envelopes the jaws 29 and extends to the tool housing 27. The pulling head 30 is movable in the axial direction of the blind rivet setting mechanism 2 so as to pull the jaws 29 to the back or rear side. The spindle 14, which is disposed on the rear side of the pulling head 30, is the drive means for pulling the jaws 29 gripping the mandrel M to the rear. A rotary motion/linear motion conversion mechanism, which converts the rotary motion of the spindle 14 to linear motion, is also provided. The pulling head 30 is moved linearly by the rotary motion/linear motion conversion mechanism, and the jaws 29 are pulled toward the back of the nose and returned toward the front of the nose. The shaft part of the mandrel M that is gripped by the jaws 29 is pulled with enough strength by the linear motion of the pulling head 30 toward the rear that it breaks at the breakable part. The mandrel head H expands and deforms part of the sleeve of the rivet body R, and the members being riveted are sandwiched firmly between that expanded and deformed sleeve part and the flange. The blind rivet B is set and secured in the members being riveted.

Figure 7:
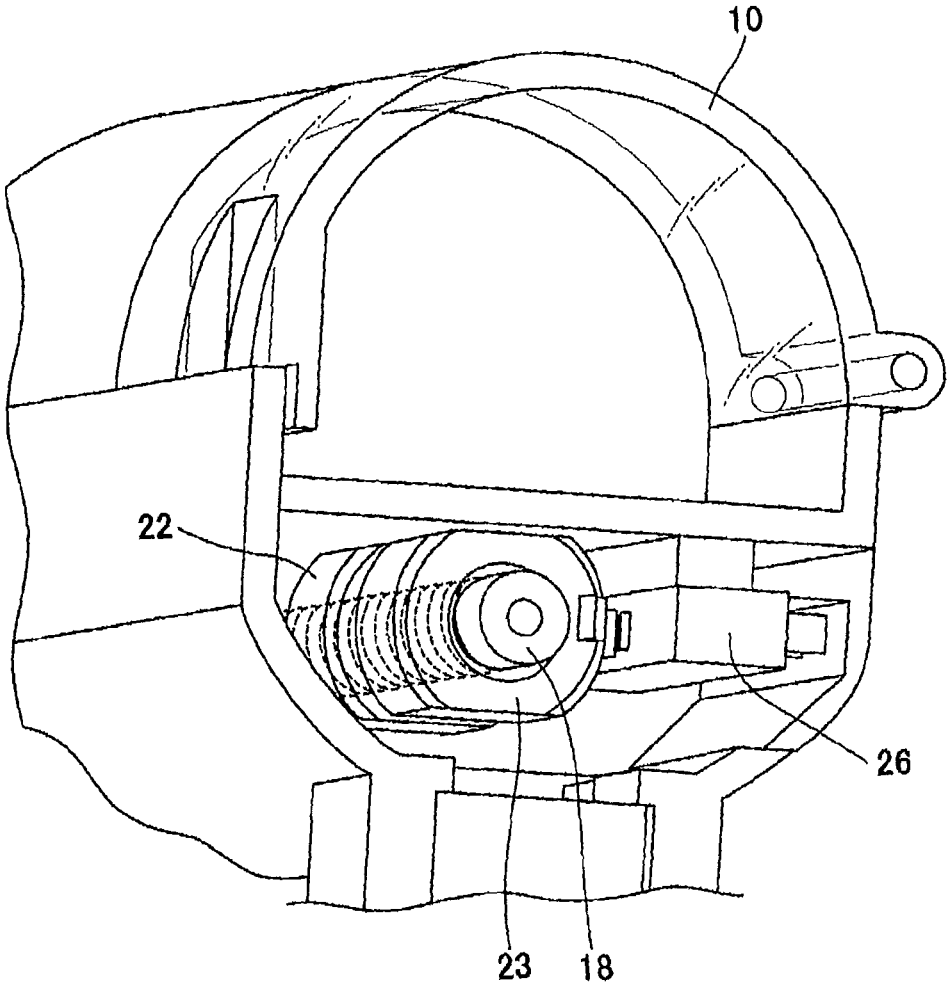
FIG. 7 is a cross-sectional view at line A-A of the drive force transfer and control section in FIG. 6.

The nose 7 also has a tip nose piece 31 and a nose housing 33 extending in a cylindrical shape from the nose piece 31 toward the tool housing 27 and affixed to the tool housing 27. *As shown in FIGS. 3 and 7, nose 7 includes a nose piece 31 that defines a receptacle extending along an axial direction of the blind rivet setting mechanism 2. The receptacle is for receiving a blind rivet that is to be set.* The cylindrically shaped pulling head 30 is accommodated inside of the nose housing 33 so as to be slidable in the axial direction (forward and backward directions) with respect to the nose housing 33. The jaws 29 are disposed such that the tip thereof is in contact with the back end of the nose piece 31, are formed in a narrowing tip shape toward the nose piece 31 and are accommodated in a cavity of the pulling head 30 that narrows toward the tip. When the pulling head 30 is pulled toward the rear, force is applied to the inclined surfaces of the narrowing part concentrically toward the axial center, and the gripping force on the shaft part of the mandrel M of the blind rivet B held in the cavity at the axial center of the jaws 29 is intensified. The jaws 29 are divided into 2 to 4 pieces in the circumferential direction inside the cylindrically shaped pulling head 30 and are assembled to a cylindrical body in the hollow of the cavity at the axial center of the pulling head 30. They receive the mandrel M of the blind rivet B inserted from the nose piece 31, and hold the shaft part of the mandrel M so that it is not released.

Figure 4:
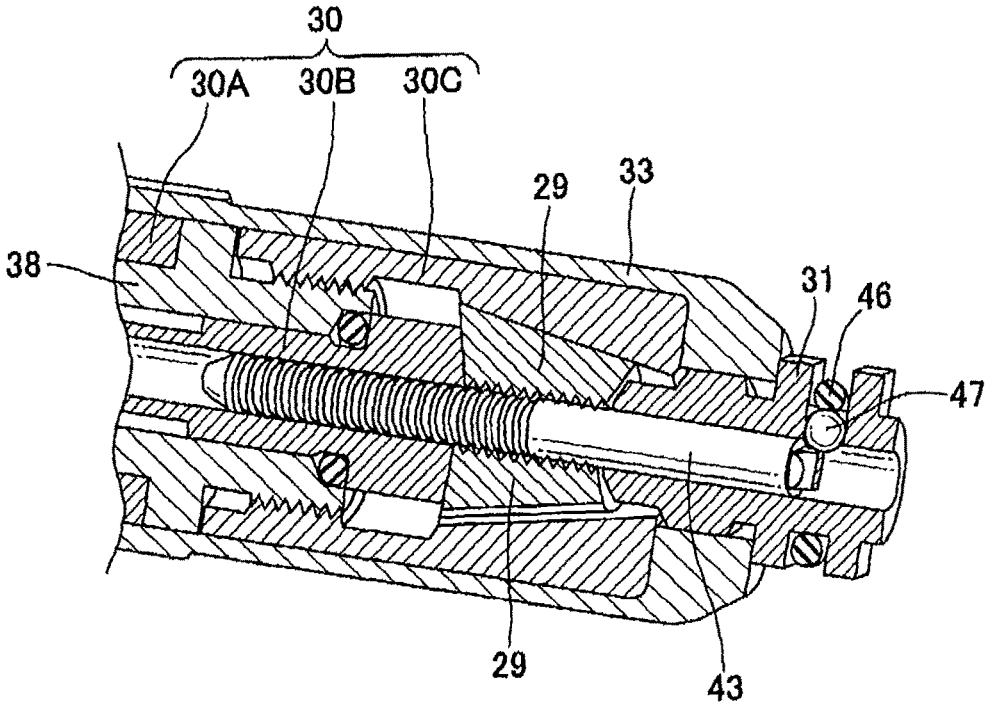
FIG. 4 is a vertical cross-sectional view of the nose part of the tip of the setting mechanism in FIG. 3 and is a drawing showing the state of a broken mandrel shaft part of a blind rivet remaining in the nose part.
Figure 5:
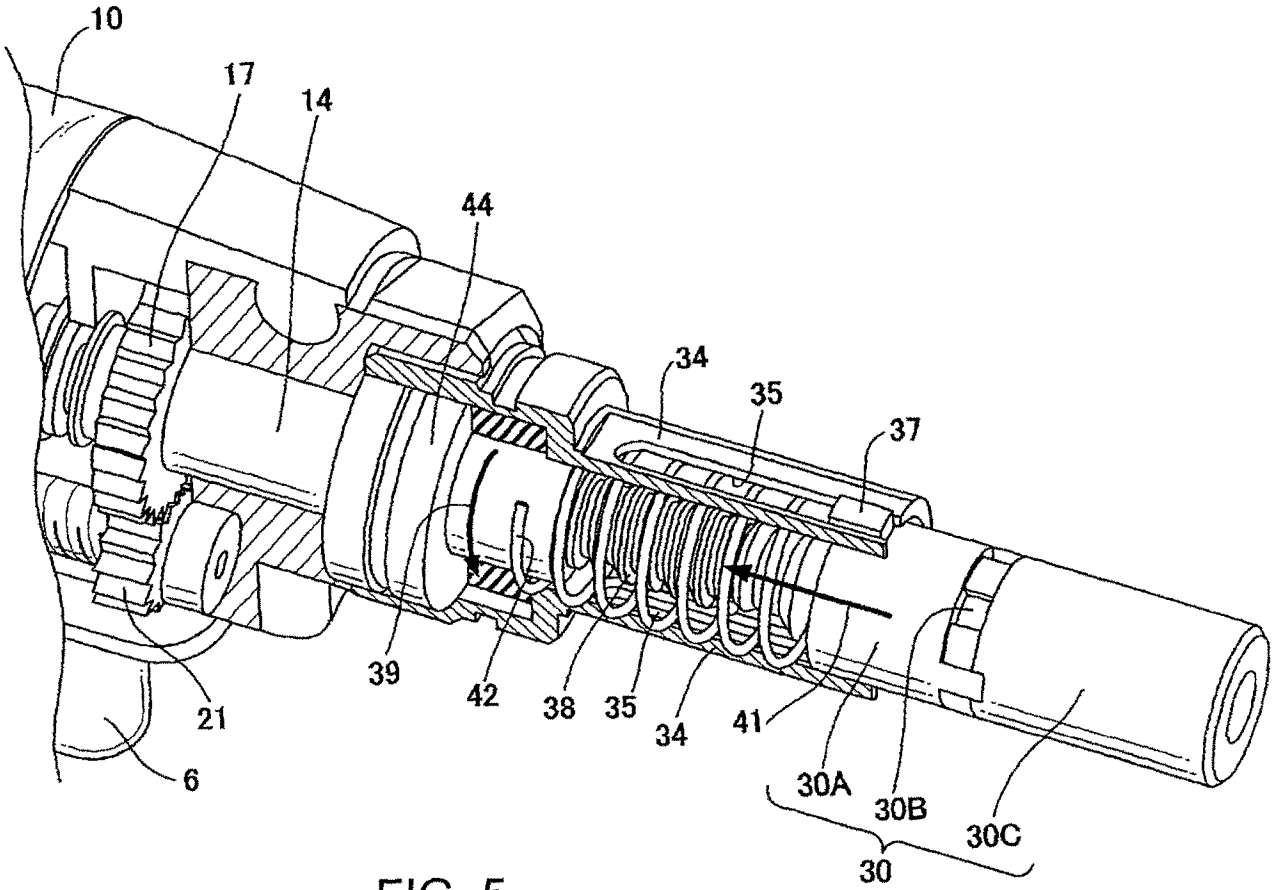
FIG. 5 is a perspective view showing the rotation/direct advance conversion mechanism and pulling head of the setting mechanism in FIG. 3 with the nose housing and nose piece removed.

In the embodiment shown in the drawings, as is shown in detail in FIG. 3 through FIG. 5, the pulling head 30 comprises a plurality of cylindrical members 30A through 30C connected in an integrated manner and disposed coaxially in the axial direction (front and back direction) for convenience of assembly. The pulling head 30 surrounds and supports the jaws 29 and is disposed in a state where the axial center is aligned with respect to the nose housing 33 and the tool housing 27 such that the jaws 29 that are in the home position at the front end may be pulled to the back end and returned to the home position in the front end from the position in the back end and also disposed so as to be slidable in the axial direction with respect to the nose housing 33 and the tool housing 27. Furthermore, as is shown in FIG. [4] *5*, the pulling head 30 has a pin 37 received so as to be slidable in an axially directed (front and back direction) slit 35 in a mast housing 34 affixed to the tool housing 27 and extending forward from the tool housing 27. Because of the slit 35 and pin 37, the pulling head 30 (and the jaws 29) are slidable in the axial direction inside the mast housing 34 and the tool housing 27 but cannot rotate around the axis. Internal threads are formed on a circular gear 44 affixed to the spindle 14. The external threads of a screw member 38 are screwed into these internal threads. The screw member 38 is affixed to the pulling head 30 and extends backward on the inside of the mast housing 34 that is affixed to the tool housing 27. As is shown in FIG. 5, the screw member 38 is screwed into the inside of the circular gear 44 that is affixed to the spindle 14; therefore, positive rotation of the spindle 14 that cannot move in the axial direction is converted to backward motion that pulls the screw member 38 toward the rear, and reverse rotation of the spindle 14 is converted into forward motion that returns the screw member 38 toward the front. Along with the pulling head 30 and the jaws 29, the screw member 38, pulls the mandrel M of the blind rivet B toward the recovery container 10 as in arrow 41 because of the positive rotation of arrow 39 in FIG. 5.

As is shown in FIG. 3, the axial center part of the jaws 29, the axial center part of the pulling head 30, the axial center part of the screw member 38 and the axial center part of the spindle 14 form a continuous hollow passage from the opening of the nose 7 to *a discharge end at* the opening of the recovery container 10. Therefore, the shaft part of a mandrel M is inserted into the jaws 29, and a broken mandrel shaft part 43 is fed into the recovery container 10 as in arrow 45 in FIG. 3. The feeding of the broken mandrel shaft part is carried out by the broken mandrel shaft parts that are fed into the hollow passage one after another pushing the previous broken mandrel shaft parts (a so-called push out system). Moreover, as is shown in FIG. 4, an o-ring 46 and a steel ball 47 are provided so as to obstruct part of the hollow passage in the opening part of the nose piece 31, and the insertion of the mandrel M of blind rivet B is allowed, but the broken mandrel shaft part 43 is prevented from being discharged to the outside from the nose piece 31.

As described above, the recovery container 10 for recovering the broken mandrel shaft parts after blind rivet setting is formed in a position in proximity to the handle 3 between the nose 7 and the motor section 9. The handle 3 extends from the position of this recovery container 10 downward at a slant such that the blind rivet setting device 1 is easily gripped by a worker. The recovery container 10 is disposed in a middle position in the tool housing 27; therefore, there is no need to install a mandrel collector at the back end of the tool housing as in Patent Reference 2, and there is no instability when held by hand by a worker because of the weight of the electric motor and operation as in Patent Reference 1.

Figure 8:
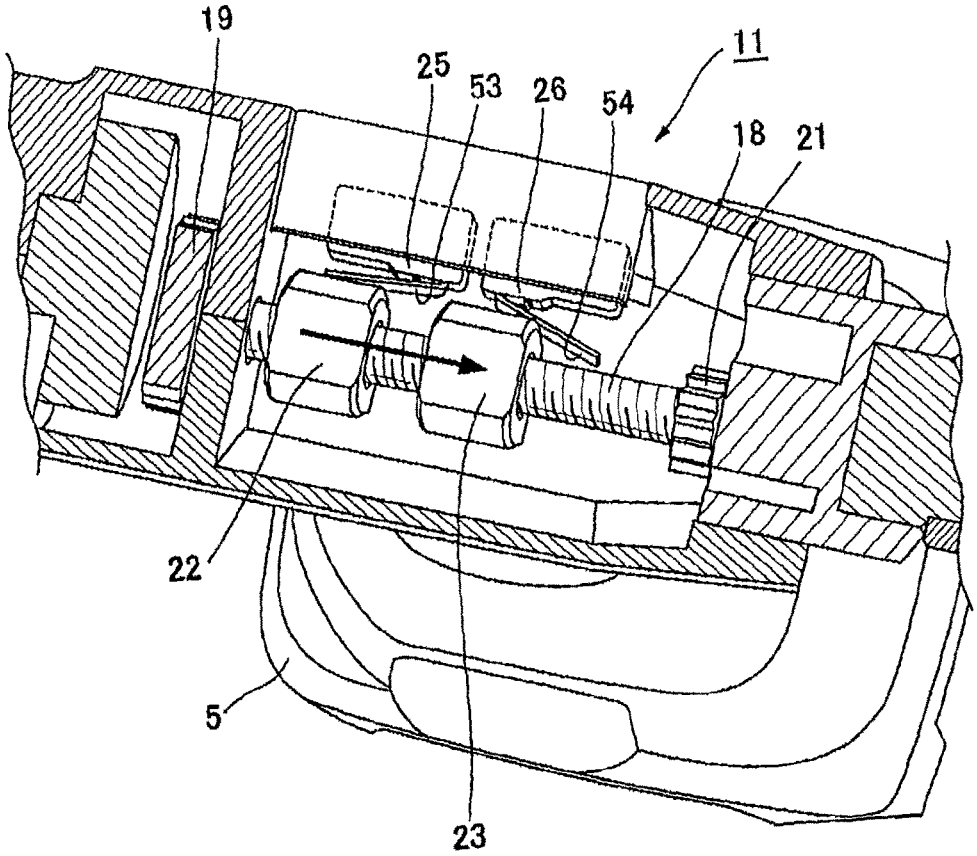
FIG. 8 is a cross-sectional view at line B-B of the drive force transfer and control section in FIG. 6 and is a drawing showing the state where the blind rivet setting mechanism is in the home position (pulling head is at the front end inside the nose).
Figure 9:
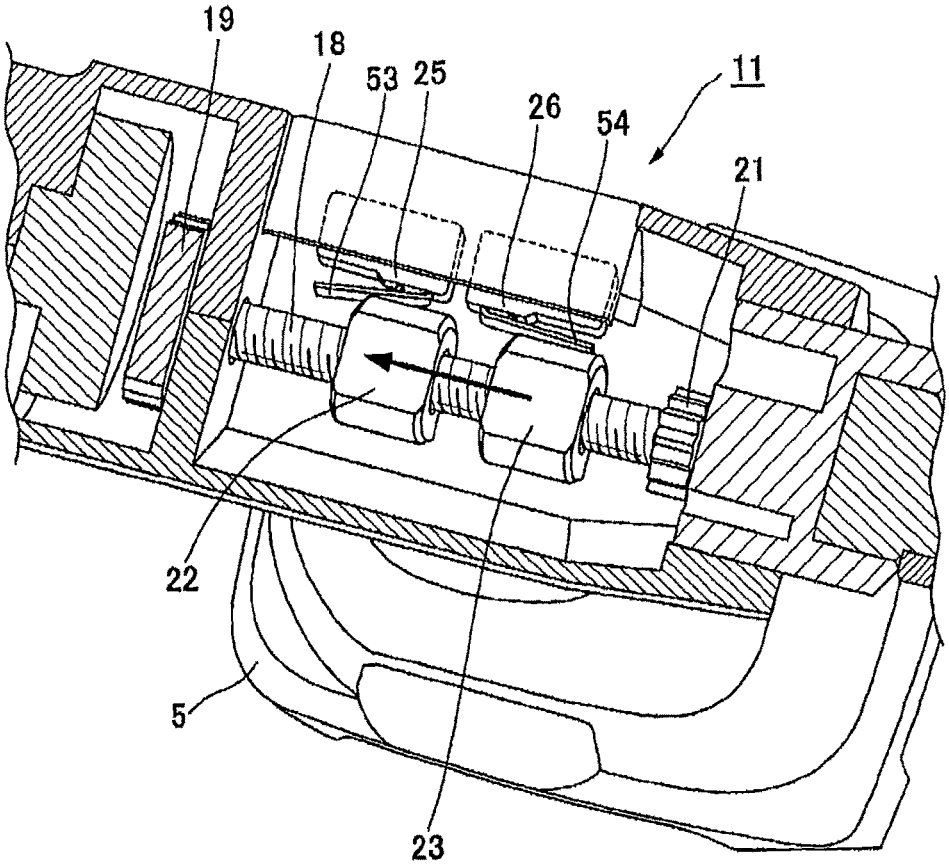
FIG. 9 is a cross-sectional view at line B-B of the drive force transfer and control section in FIG. 6 and is a drawing showing the state where the blind rivet setting mechanism is in the position where the breaking of the mandrel shaft part is complete (pulling head is at the back end inside the nose).
Figure 10:
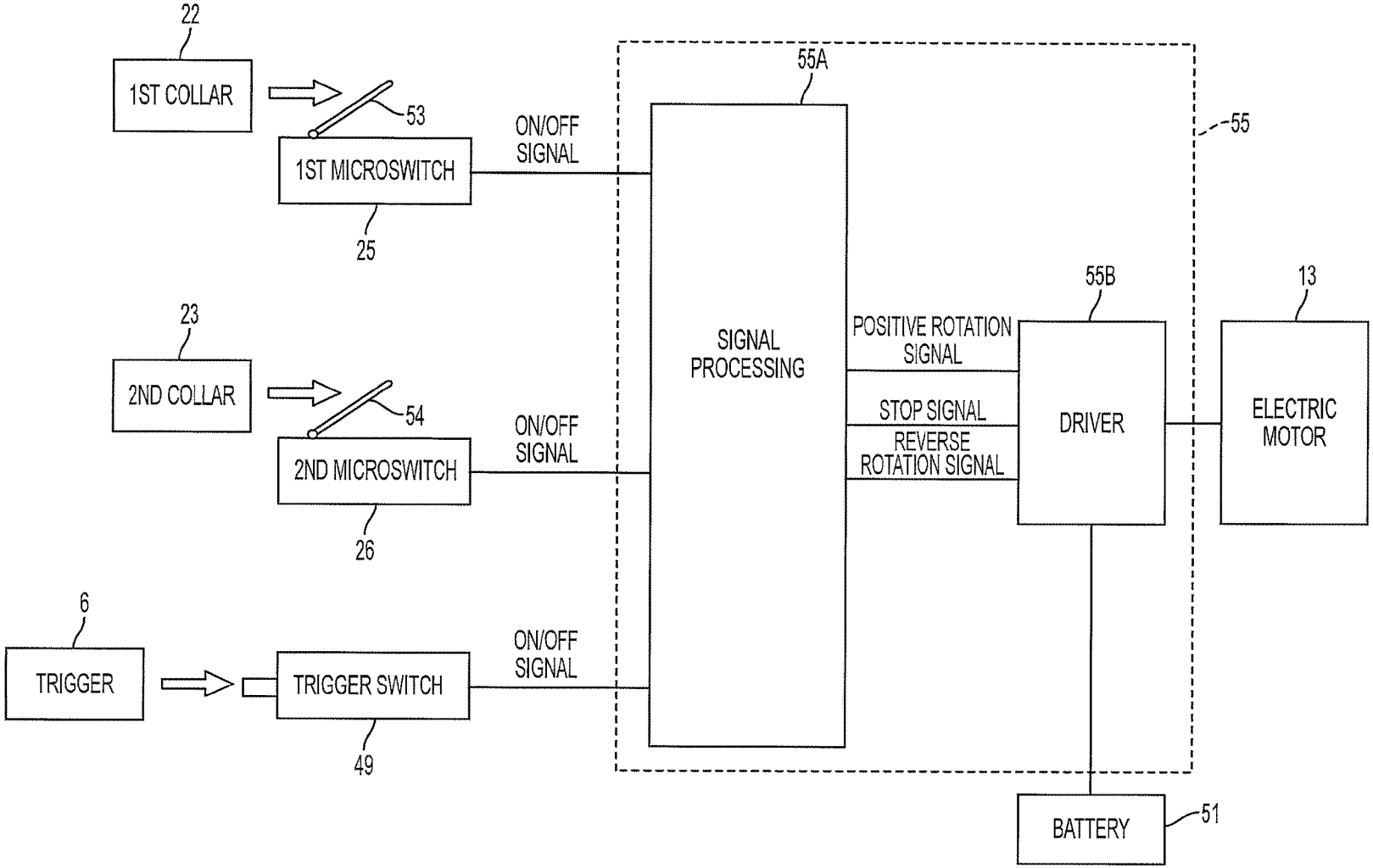
FIG. 10 is a block diagram of the control circuit for the drive force transfer and control section.

The drive force transfer and control section 11, which is an important part of the electric blind rivet setting device 1 according to the present invention will be described with reference to FIG. 6 through FIG. 10. As was previously described with reference to FIG. 2, the drive force transfer and control section 11 transfers the rotational force from the electric motor 13 in the motor section 9 to the spindle 14 in the nose 7, circumventing the space occupied by the recovery container 10. In addition, the drive force transfer and control section 11 also controls the positive rotation, stopping and reverse rotation of the electric motor 13 according to the pulling operation of the trigger 6 and the release operation thereof. The rotation of the electric motor 13 motor shaft around the axis rotates the drive shaft 18 around its axis by means of the motor gear 15 and the rear gear 19, and the rotation of the drive shaft 18 rotates the spindle 14 around its axis by means of the front gear 21 and the spindle gear 17. As is shown in FIG. 10, the electric motor 13 responds to on and off signals of a trigger switch 49 because of the pulling operation of the trigger 6 and the release operation thereof and is controlled through a control circuit 55. The pulling head 30 in the nose 7 is moved backward from the home position at the front end of the blind rivet setting mechanism 2 to the back end position that breaks the mandrel shaft part of the blind rivet B, is stopped at that position and moves forward from the back end position to the home position in the front end position.

As is shown in FIG. 2 and FIG. 6 through FIG. 9, the drive shaft 18 is formed with threads on the circumferential surface, and two collars, the first collar 22 and the second collar 23, formed with internal threads are screwed onto the drive shaft 18. As is shown in FIG. 7, the first collar 22 and the second collar 23 are formed in an elliptical cylindrical shape having a flat surface on the top and bottom, and that flat surface is disposed so as to be slidable underneath the recovery container 10. The two collars 22 and 23 are restricted such that they do not rotate with the axial rotation of the drive shaft 18. Therefore, the two collars 22, 23 move forward together (arrow 50 in FIG. 6) following the peaks of the threads on the drive shaft 18 when the drive shaft 18 is rotated in reverse by the positive rotation of the electric motor 13. When the electric motor 13 is rotated in reverse, they move together backwards (direction the reverse of arrow 50) following the peaks of the threads on the drive shaft 18, which is rotating positively. As is shown in detail in FIG. 8 and FIG. 9, the first microswitch 25 is affixed to the tool housing 27 (or a member affixed to the tool housing 27) as a first sensor adjacent to the first collar 22, and the second microswitch 26 is affixed to the tool housing 27 (or a member affixed to the tool housing 27) as a second sensor adjacent to the second collar 23. When the first collar 22 moves along the drive shaft 18, the first microswitch 25 is turned on and off, and when the second collar 23 moves along the drive shaft 18, the second microswitch 26 is turned off and on.

The manner in which the electric motor 13 (spindle 14) and the pulling head 30 (and jaws 29) are controlled by the control means according to the operation of the trigger 6, the on/off operation of the first microswitch 25 by the first collar 22 and the on/off operation of the second microswitch 26 by the second collar 23 will be described with reference to FIG. 8, FIG. 9 and FIG. 10.

In the control circuit 55, which is the control means, in FIG. 10, an on/off signal is input from the first microswitch 25 which is turned on and off by the first collar 22, an on/off signal input from the second microswitch 26 which is turned on and off by the second collar 23 and an on/off signal of the trigger switch 49 input by the pulling operation of the trigger 6 and the release thereof. A signal processing section 55A that receives the on/off signal from the first microswitch 25, the on/off signal from the second microswitch 26 and the on/off signal of the trigger switch 49 and outputs a positive rotation signal, stop signal and reverse rotation signal for positive rotation, stopping and reverse rotation of the electric motor 13 is provided in the control circuit 55. Furthermore, a driver 55B that controls the electric power supply from a battery 51 is provided in the control circuit 55 such that the positive rotation signal, stop signal and reverse rotation signal from the signal processing section 55A are received and the electric motor 13 is rotated positively, stopped or rotated in reverse. The signal processing section 55A and driver 55B forming the control circuit 55 are, for example, disposed in an empty space in the handle 3.

Before the electric motor 13 is supplied with electric power from the battery 51, the pulling head 30 is positioned in the home position (position in FIG. 3) on the front end side of the blind rivet setting mechanism 2 by a coil spring 42 (FIG. 5). When the pulling head 30 is in the home position, the first collar 22 pushes a switch lever 53 of the first microswitch 25 and an on signal is output by the first microswitch 25. On the other hand, the second collar 22 does not push a switch lever 54 of the second microswitch 26, so an off signal is output by the second microswitch 26. Therefore, in a state where no on signal is output by the trigger switch 49 of the trigger 6 (or an off signal is output), the pulling head 30 (jaws 29) is in the home position when an on signal is output by the first microswitch 25 and an off signal is output by the second microswitch 26. Even if electric power is supplied to the electric motor 13 from the battery 51, the operation of the electric motor 13 is stopped as long as the trigger 6 is not operated. The first microswitch 25 outputs an on signal, and the second microswitch 26 outputs an off signal. The control circuit recognizes that the setting device 1 is in the home position state through an off signal from the trigger switch 49 of the trigger 6, an on signal from the first microswitch 25 and an off signal from the second microswitch 26.

If the trigger 6 is pulled in a state where an on signal is output by the first microswitch 25 and an off signal is output by the second microswitch 26, an on signal is output by the trigger switch 49, and the signal processing section 55A of the control circuit 55 provided in the electric blind rivet setting device 1 outputs a positive rotation signal that rotates the electric motor 13 positively. The driver 55B that has received the positive rotation signal sends electric power from the battery 51 to the electric motor 13 and causes positive rotation. The positive rotation of the electric motor 13 is transferred to the spindle 14 through the motor gear 15, rear gear 19, drive shaft 18, front gear 21 and spindle gear 17, and the spindle rotates positively. The positive rotation of the spindle 14 rotates the screw member 38 (FIG. 5) positively and causes the pulling head 30 to move backward a prescribed length (length that breaks the mandrel shaft part) from the home position at the front end. The jaws 29 are moved backward from the home position at the front end by this backward movement, and the shaft part of the mandrel M of blind rivet B that has been gripped by the jaws 29 is pulled backwards. This pulling toward the back is strong enough to break the mandrel shaft part, and the mandrel head H expands and deforms part of the sleeve of the rivet body R. Members being riveted are strongly sandwiched between this expanded and deformed sleeve part and the flange of the rivet body R. The rivet body is set in the members being riveted and an automotive body panel, component, and the like are secured by a plurality of members being riveted, such as an automotive body panel, a component or the like, being strongly sandwiched to each other between the sleeve part that has been expanded and deformed and the flange part.

Figure 6:
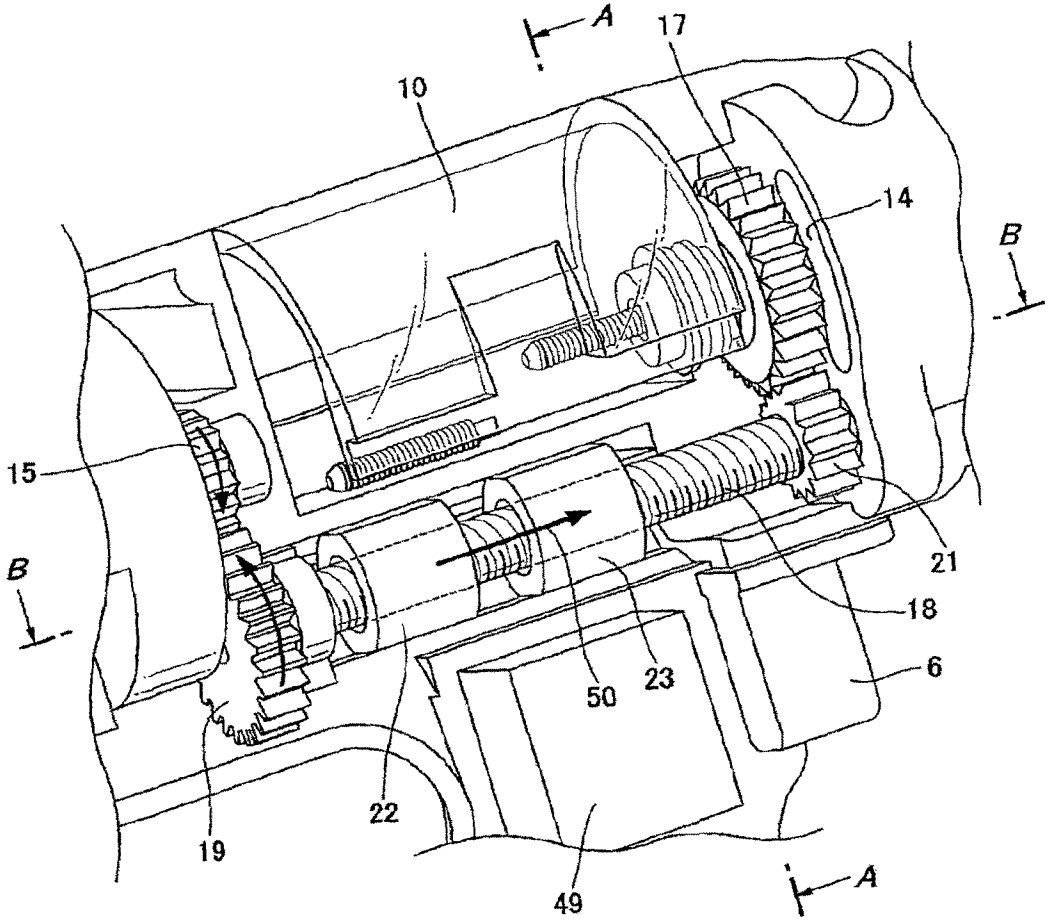
FIG. 6 is a perspective view showing the drive force transfer and control section of the electric blind rivet setting device in FIG. 1.

The positive rotation of the electric motor 13 rotates the drive shaft 18 in reverse because of the motor gear 15 and the rear gear 19, and as is shown by the arrow 50 in FIG. 6, the first collar 22 and the second collar 23 move forward. The rotation of the drive shaft 18 moves the pulling head 30 in the axial direction and also moves the first collar 22 and the second collar 23; therefore, the position of the pulling head 30 in the axial direction is detected by the first microswitch 25 and the second microswitch 26 that are turned on and off by the first collar 22 and the second collar 23. Because of the first collar 22 moving a prescribed length (corresponding to a length of movement of the pulling head 30 that breaks the mandrel shaft part) on the drive shaft 18, the switch lever 53 of the first microswitch 25 is pushed in, and the on signal of the first microswitch 25 is changed to an off signal. On the other hand, the second collar 23 moves with the first collar 22, and when the pulling head 30 moves to the back end position, which is the breaking position for the mandrel shaft part, the second collar 23 pushes the switch lever 54 of the second microswitch 26, and the off signal of the second microswitch 26 changes to an on signal. In addition, the trigger 6 is still being operated by pulling, so an on signal is output by the trigger switch 49. In a state where an on signal is output by the trigger switch 49, the pulling head 30 (jaws 29) is in the back end position on the furthest back side when an off signal is output by the first microswitch and an on signal is output by the second microswitch 30. At this time, the signal processing section 55A of the control circuit 55 receives the on signal from the trigger switch 49, the off signal from the first microswitch 25 and the on signal from the second microswitch 26 and outputs a stop signal. The driver 55B receives the stop signal and stops the rotation of the electric motor 13 (stops by brake operation, stops by regenerative braking or the like). With the stopping of the electric motor 13, the rotation of the spindle 14 also stops, and the pulling head 30 (jaws 29) is stopped at the back end position.

When the pulling operation of the trigger 6 is released in the state where the rotation of the electric motor 13 is stopped and the pulling head 30 is in the back end position (in other words, the state where an on signal is output by the trigger switch 49 of the trigger 6, an off signal output by the first microswitch 25 and an on signal output by the second microswitch 26), the on signal from the from the trigger switch 49 of the trigger 6 disappears (or an off signal is output). The signal processing section 55A of the control circuit 55 receives the off signal from the trigger switch 49, the off signal from the first microswitch 25 and the on signal from the second microswitch 26 and outputs a reverse rotation signal. The driver 55B that receives the reverse rotation signal rotates the electric motor 13 in reverse. The spindle 14 is rotated in reverse by the reverse rotation of the electric motor 13, the screw member 38 rotated in reverse and the pulling head 30 (jaws 29) is moved from the back end position toward the home position at the front end. In addition, the drive shaft 18 is rotated positively, and the first collar 22 and the second collar 23 move in the direction opposite of the arrow 50 in FIG. 6. Therefore, the second collar 23 is separated from the second microswitch 26, and an off signal is output by the second microswitch 26. The first collar 22 approaches the first microswitch 25, and when the pulling head 30 returns to the home position, the first collar 22 pushes the switch lever 53 of the first microswitch 25, and an on signal is output by the first microswitch 25. As described above, this state is the state before operation of the blind rivet setting device 1 began. In other words, as long as the trigger 6 is not operated, the control circuit 55 keeps the electric motor 13 in a non-operating state. Therefore, the operation of the electric motor 13 is stopped, and the pulling head 30 is in the home position.

Moreover, during positive rotation of the electric motor 13, the first collar 22 and the second collar 23 move forward along the drive shaft 18. An off signal is output by the first microswitch 25. However, if the pulling operation of the trigger 6 is released in the state where the second collar 23 is [in a position] before it presses the switch lever 54 of the second microswitch 26 and the off signal is being output by the second microswitch 26, the signal processing section 55A of the control circuit 55 receives the off signal from the first microswitch 25, the off signal from the second microswitch 26 and the off signal from the trigger switch 49 of the trigger 6. A reverse rotation signal is sent to the driver 55B, and the driver 55B rotates the electric motor 13 in reverse. The reverse rotation of the electric motor 13 continues until in an on signal is output by the first microswitch 25 and an off signal is output by the second microswitch 26, and the pulling head 30 (jaws 29) returns to the home position on the front end side of the blind rivet setting mechanism 2. Therefore, even if the blind rivet setting operation is terminated for some reason, it is assured that the pulling head 30 will return to the home position. Therefore, even when the blind rivet setting operation is terminated while in progress, blind rivet setting operation may be continued easily by releasing the pulling operation of the trigger 6.

It will be appreciated by persons skilled in the art that the above embodiments have been described by way of example only, and not in any limitative sense, and that various alterations and modifications are possible without departure from the scope of the invention as defined by the appended claims.

What is claimed is:

[1. An electric blind rivet setting device comprising a hollow nose that accepts a mandrel of a blind rivet comprising a mandrel and rivet body, a tool housing disposed in the axial direction behind said nose, jaws that are disposed inside said nose for gripping the mandrel, a pulling head that is inside said nose for pulling said jaws backward in the axial direction from a home position and returns said jaws to said home position, an electric motor that forms a drive power source for moving said pulling head in the axial direction and a drive force transfer gear train to pull said pulling head from said home position backward in the axial direction and return said pulling head forward in the axial direction to said home position from a back position by the rotation of said electric motor;

said housing including a handle and a trigger switch for operating said electric motor to set the rivet when the rivet body is expanded by the mandrel of a blind rivet gripped in said jaws being pulled backward in the axial direction from said home position by said pulling head, said housing including a recovery container for receiving a part of the broken mandrel shaft from said pulling head when said rivet body is set in members being riveted, said container being located in said housing between said motor and said pulling head on a front side of said electric motor in the axial direction, said electric motor being at the back end of said tool housing and disposed on a rear side in the axial direction of said recovery container, said drive force transfer gear train being provided in a part of said tool housing below said recovery container, circumventing said recovery container, said drive force transfer gear train being connected to said electric motor on the rear side of said recovery container so that said drive force transfer gear train rotates with said electric motor, said gear train including a drive shaft that extends forward in the axial direction from a back end and is mounted for rotation about its own axis, and a spindle that is connected to an end part of said drive shaft at the front side of said recovery container so that said spindle is rotated by the rotation of said drive shaft, said spindle being connected to said pulling head so that said pulling head is moved backward in the axial direction or forward in the axial direction by the rotation of said spindle and a control circuit including said trigger switch and two position sensors for controlling said electric motor forward rotation, stopping of rotation and reverse rotation by detecting pulling operations of said trigger and the position of said pulling head in the axial direction due to the rotation of said drive shaft.]

[2. The setting device according to claim 1 wherein said drive shaft is disposed so as to be able to rotate around its own axis in the space below said recovery container by a rear gear coupled to a motor gear connected to said electric motor, said drive shaft also being coupled to a front gear that is mated to a spindle gear connected to said spindle, said drive shaft having external threads formed in the outer circumferential surface of said drive shaft between said rear gear and said front gear, said drive shaft having a first collar and a second collar, said collars having internal threads coupled to said drive shaft threads to move the collars in the axial direction upon rotation of said drive shaft, a first one of said sensors being positioned in said tool housing adjacent to said first collar and a second one of said sensors positioned in said tool housing adjacent to said second collar, a control circuit that receives a signal from said first sensor, a signal from said second sensor and a signal from the pulling operation of said trigger, said control circuit operating so that, when said pulling head is in the state of being in said home position, said electric motor is rotated positively to move the pulling head to the rear in the axial direction when the operation of pulling said trigger is carried out and when said pulling head has been pulled back to the back position in the axial direction, the rotation of said electric motor is stopped and with the release of said trigger pulling operation, said electric motor reverses rotation and said pulling head is returned to said home position.]

[3. The setting device according to claim 2, wherein said first sensor is a first microswitch that is turned on and off by the movement of said first collar on said drive shaft in the axial direction, and said second sensor is a second microswitch that is turned on and off by the movement of said second collar on said drive shaft in the axial direction.]

[4. The setting device according to claim 3, wherein, when said pulling head is in the home position, an off signal is sent to the control circuit from said trigger switch as long as the trigger is not pulled, said first collar energizes said first microswitch and an on signal is sent to the control circuit by said first microswitch, an off signal is sent to the control circuit by the second microswitch as long as the second microswitch is not energized by said second collar, and said control circuit maintains the pulling head in the home position, in the home position, said control circuit rotates said electric motor positively when said trigger is operated by pulling and an on signal is sent to the control circuit by said trigger, said drive shaft is rotated, said spindle is rotated, said pulling head pulls a mandrel of a blind rivet gripped in said jaws a prescribed length rearward in the axial direction and breaks the mandrel shaft part gripped in said jaws along with setting the blind rivet in members being riveted, said first collar also moves a prescribed length in said first direction because of the rotation of said drive shaft and separates from the position that energizes said first microswitch, the positive rotation of said electric motor is stopped by an off signal sent by said first microswitch, and an on signal output by said second microswitch when said second collar moves a prescribed length in said first direction to a position that energizes said second microswitch and an on signal is sent from said trigger switch, when the pulling operation of said trigger switch is released after stopping the positive rotation of said electric motor, an off signal is received from said trigger switch, an off signal is received from said first microswitch and an on signal is received from said second microswitch, and said electric motor is rotated in reverse, said drive shaft is rotated, said spindle is rotated in reverse, said pulling head is returned forward in the axial direction and returns to said home position with said jaws, said first collar also moves a prescribed length in a second direction opposite to said first direction because of the rotation of said drive shaft and returns to the position that energizes said first microswitch, an on signal is sent by said first microswitch, said second collar moves a prescribed length in said second direction and separates from the position that energizes said second microswitch, an off signal is sent by said second microswitch and said home position state is maintained by the off signal from said trigger switch, the on signal from said first microswitch and the off signal from said second microswitch.]

[5. A blind rivet setting tool comprising an elongated housing having an axis and a handle;

said housing having a nosepiece aligned with said axis containing a receptacle for receiving a blind rivet that is to be set;

a pulling head having pulling jaws for gripping the mandrel of a rivet and pulling the mandrel in the direction of the axis to set the rivet;

a mandrel container for receiving broken mandrels, said container being located at a discharge end of the pulling head;

an electric motor located in said housing at an opposite end of said tool from said nosepiece, said motor having a rotary output shaft, said shaft driving a power transfer mechanism comprising a rotary gear on said shaft, a drive shaft parallel to the axis of the housing, said shaft being coupled to rotate with said gear, a pair of collars coupled to said shaft by threads on the shaft and the collars so that the collars move axially of the tool as the shaft rotates, said collars being coupled to said pulling head to grip and pull the mandrel and set the rivet;

a control circuit mounted in said tool for controlling the operation of the tool, said circuit comprising a trigger switch controlled by the operator and a pair of position-sensitive switches positioned adjacent said collars to locate the position of the pulling head and continue a setting operation or return the mechanism to a home position.]

*6. An electric blind rivet setting device comprising a hollow nose that accepts a mandrel of a blind rivet comprising a mandrel and rivet body, a tool housing disposed in an axial direction behind said nose, jaws disposed inside said nose for gripping the mandrel, a pulling head inside said nose for pulling said jaws backward in the axial direction from a home position and returns said jaws to said home position, an electric motor disposed in the housing for moving said pulling head in the axial direction and a drive force transfer gear train to pull said pulling head from said home position backward in the axial direction and return it*

*forward in the axial direction to said home position by the rotation of said electric motor; said housing including a handle and a trigger switch for operating said electric motor to set the rivet when the rivet body is expanded by the mandrel of a blind rivet gripped in said jaws being pulled backward in the axial direction from said home position by said pulling head, said housing including a recovery container for receiving a part of the broken mandrel shaft from said pulling head, said container being located in said housing between said motor and said pulling head, said drive force transfer gear train being provided in said tool housing, circumventing said recovery container.*

*7. The electric blind rivet setting tool device of claim 6, wherein said drive force gear train which includes a drive shaft that extends forward in the axial direction from a back side of said recovery container and is mounted for rotation about its own axis, and a spindle that is connected to the end part of said drive shaft at a front side of said recovery container so that said spindle is rotated by the rotation of said drive shaft, said spindle being connected to said pulling head so that said pulling head is moved backward in the axial direction or forward in the axial direction by the rotation of said spindle.*

*8. The electric blind rivet setting tool device of claim 7, wherein said drive force transfer gear train is connected to said electric motor on the rear side of said recovery container so that it rotates with said electric motor.*

*9. The electric blind rivet setting tool device of claim 6, further including a control circuit including a position sensor and said trigger switch for controlling said electric motor forward rotation, stopping of rotation and reverse rotation by detecting pulling operations of said trigger and the position of said pulling head in the axial direction due to the rotation of said drive shaft.*

*10. An electric blind rivet setting device comprising a hollow nose that accepts a mandrel of a blind rivet comprising a mandrel and rivet body, a tool housing disposed in an axial direction behind said nose, jaws disposed inside said nose for gripping the mandrel, a pulling head inside said nose for pulling said jaws backward in the axial direction from a home position and returns said jaws to said home position, an electric motor disposed in the housing for moving said pulling head in the axial direction and a drive force transfer gear train to pull said pulling head from said home position backward in the axial direction and return it forward in the axial direction to said home position by the rotation of said electric motor; said housing including a handle and a trigger switch for operating said electric motor to set the rivet when the rivet body is expanded by the mandrel of a blind rivet gripped in said jaws being pulled backward in the axial direction from said home position by said pulling head, said housing including a recovery container for receiving a part of the broken mandrel shaft from said pulling head, said container being located in said housing between said motor and said pulling head.*

* * * * *